United States Patent
Scherb (10) Patent No.: US 9,787,433 B2
(45) Date of Patent: Oct. 10, 2017

(54) DEMODULATION TECHNIQUE

(71) Applicant: Telefonaktiebolaget LM Ericsson (publ), Stockholm (SE)

(72) Inventor: Ansgar Scherb, Lauf an der Pegnitz (DE)

(73) Assignee: TELEFONAKTIEBOLAGET L M ERICSSON (PUBL), Stockholm (SE)

( * ) Notice: Subject to any disclaimer, the term of this patent is extended or adjusted under 35 U.S.C. 154(b) by 0 days.

(21) Appl. No.: 14/898,204

(22) PCT Filed: Jun. 14, 2013

(86) PCT No.: PCT/EP2013/062393
§ 371 (c)(1),
(2) Date: Dec. 14, 2015

(87) PCT Pub. No.: WO2014/198335
PCT Pub. Date: Dec. 18, 2014

(65) Prior Publication Data
US 2016/0142182 A1 May 19, 2016

(51) Int. Cl.
*H04L 25/00* (2006.01)
*H04B 7/216* (2006.01)
(Continued)

(52) U.S. Cl.
CPC ......... *H04L 1/0054* (2013.01); *H04B 7/0413* (2013.01); *H04L 1/0059* (2013.01);
(Continued)

(58) Field of Classification Search
CPC ... H04L 1/0059; H04L 1/0057; H04L 1/0065; H04L 1/0054; H04L 27/2649;
(Continued)

(56) References Cited

U.S. PATENT DOCUMENTS 6,078,626 A * 6/2000 Ramesh ............... H04L 1/0059
375/262
6,310,887 B1 * 10/2001 Hatakeyama ....... H04L 25/0262
370/320
(Continued)

FOREIGN PATENT DOCUMENTS

EP 2 346 223 A1 7/2011

OTHER PUBLICATIONS

International Search Report and Written Opinion of the International Searching Authority, Application No. PCT/EP2013/062393, Feb. 28, 2014.
(Continued)

*Primary Examiner* — Daniel Washburn
*Assistant Examiner* — Sarah Hassan
(74) *Attorney, Agent, or Firm* — Sage Patent Group (57) ABSTRACT

A technique for assessing the reliability of bits received by a modulation symbol on a channel is provided. A providing circuit provides an input dataset including a plurality of input values. The input values correspond to different transmit hypotheses according to a modulation alphabet used for encoding the bits in the symbol. A computing circuit performs a first computing step and a second computing step. In the first computing step, a first intermediary dataset is computed by combining the input values of the input dataset according to a first combination scheme. In the second computing step, a second intermediary dataset is computed by combining the input values of the input dataset according to a second combination scheme. The second combination scheme is different from the first combination scheme. An assessing circuit assesses the reliability of the bits based on the first intermediary dataset and the second intermediary dataset.

19 Claims, 8 Drawing Sheets

(51) Int. Cl.
*H04L 1/00* (2006.01)
*H04L 25/06* (2006.01)
*H04B 7/0413* (2017.01)
*H04L 25/02* (2006.01)

(52) U.S. Cl.
CPC ........ *H04L 1/0075* (2013.01); *H04L 25/0204* (2013.01); *H04L 25/067* (2013.01)

(58) Field of Classification Search
CPC ... H04L 5/0053; H04L 1/0075; H04L 1/0618; H04L 1/18
USPC .................. 375/262, 350, 240, 233; 370/320
See application file for complete search history.

(56) References Cited

U.S. PATENT DOCUMENTS

| | | | | |
|---|---|---|---|---|
| 6,618,452 | B1* | 9/2003 | Huber | H04L 27/2607 370/512 |
| 2001/0055331 | A1* | 12/2001 | Agazzi | G01R 31/3004 375/216 |
| 2002/0060604 | A1* | 5/2002 | Hammes | H04L 25/03197 329/300 |
| 2003/0007581 | A1* | 1/2003 | Agazzi | G01R 31/3004 375/341 |
| 2005/0175122 | A1* | 8/2005 | Nefedov | H04B 1/7105 375/323 |
| 2007/0291860 | A1* | 12/2007 | Wang | H04L 1/0071 375/260 |
| 2008/0056392 | A1 | 3/2008 | Park et al. | |
| 2013/0208766 | A1* | 8/2013 | Balraj | H04L 1/00 375/147 |

OTHER PUBLICATIONS

Seethaler et al., "Efficient Soft Demodulation in MIMO-OFDM Systems With BICM and Constant Modulus Alphabets", *2006 IEEE International Conference on Acoustics, Speech and Signal Processing* (ICASSP 2006 Proceedings), May 14-19, 2006, pp. IV-105-IV-108.

* cited by examiner

$$F_2 = \begin{pmatrix} 0 & 1 & 0 & 1 \\ 1 & 0 & 1 & 0 \\ 0 & 0 & 1 & 1 \\ 1 & 1 & 0 & 0 \end{pmatrix}$$

$F_2(0)$  $F_2(1)$ $$F_3 = \begin{pmatrix} 0 & 1 & 0 & 1 & 0 & 1 & 0 & 1 \\ 1 & 0 & 1 & 0 & 1 & 0 & 1 & 0 \\ 0 & 0 & 1 & 1 & 0 & 0 & 1 & 1 \\ 1 & 1 & 0 & 0 & 1 & 1 & 0 & 0 \\ 0 & 0 & 0 & 0 & 1 & 1 & 1 & 1 \\ 1 & 1 & 1 & 1 & 0 & 0 & 0 & 0 \end{pmatrix}$$

$$G_2 = \begin{pmatrix} 0 & 0 & 1 & 1 \\ 1 & 1 & 0 & 0 \end{pmatrix}$$

$G_2(0)$  $G_2(1)$ $$G_3 = \begin{pmatrix} 0 & 0 & 0 & 0 & 1 & 1 & 1 & 1 \\ 1 & 1 & 1 & 1 & 0 & 0 & 0 & 0 \end{pmatrix}$$

DEMODULATION TECHNIQUE

CROSS REFERENCE TO RELATED APPLICATION

This application is a 35 U.S.C. §371 national stage application of PCT International Application No. PCT/EP2013/062393, filed on Jun. 14, 2013, the disclosure and content of which is incorporated by reference herein in its entirety. The above-referenced PCT International Application was published in the English language as International Publication No. WO 2014/198335 A1 on Dec. 18, 2014.

TECHNICAL FIELD

The present disclosure generally relates to a demodulation technique providing a reliability output. More specifically, and without limitation, the present disclosure provides a method of assessing the reliability of bits received by means of a modulation symbol on a noisy channel, and a device for performing the method.

BACKGROUND

For exchanging or storing data, a sequence of bits is represented by a physical quantity, such as an electromagnetic wave for wireless exchange and a flux density pattern for storage on a magnetic disc or tape drive. The bits are encoded into the physical quantity according to a modulation scheme. The physical quantity is also referred to as a modulation symbol. The encoding according to the modulation scheme is also referred to as keying. Quadrature Phase-Shift Keying (QPSK) is an example for a modulation scheme applied for wireless exchange. Run-Length Limited (RLL) coding is an example for a line modulation scheme used in both telecommunications and storage systems.

The modulation scheme assigns one modulation symbol to a sequence of two or more bits. The modulation symbol may thus assume four or more different values, e.g., to improve an effective data rate by exploiting the continuity of the physical quantity. The different values are collectively referred to as a symbol alphabet. Furthermore, encoding a plurality of bits into one modulation symbol allows representing the data as a sequence of changes in the physical quantity for edge detection or Partial Response Maximum Likelihood (PRML) interpretation of the sequence.

The symbol alphabet specifies ideal symbols, each of which represents a certain bit sequence. A modulation symbol received on a noisy channel does not necessarily coincide uniquely with one of the symbols of the symbol alphabet. Given the received modulation symbol, it is possible to provide likelihood values for different transmit hypotheses, i.e., for the different symbols of the symbol alphabet.

For assessing the reliability of an individual bit out of the bit sequence, it is necessary to take into account the likelihood values of all possible transmit hypotheses, since the likelihood of each transmit hypothesis contributes to the likelihood for the individual bit being either 0 or 1. The reliability of the individual bit can be represented by a so-called Log-Likelihood-Ratio (LLR). In implementations of both telecommunications and storage systems, the LLRs of individual bits are input to a channel decoder.

Document EP 2 346 223 A1 describes a conventional technique for calculating LLRs received on a Single Input Single Output (SISO) channel. Research publication "Efficient Soft Demodulation in MIMO-OFDM Systems with BICM and Constant Modulus Alphabets" by D. Seethaler et al., Proc. IEEE ICASSP 2006, pp. 105 to 108, suggests an approximation for reducing the complexity of computing LLRs for bits received on a Multiple Input Multiple Output (MIMO) channel.

For a sequence including $J$ bits, the symbol alphabet comprises at least $2^J$ symbols so that the likelihood values of $2^J$ symbol hypotheses have to be taken into account for computing the reliability of one bit. For a 4×4 MIMO channel with Quadrature Amplitude Modulation (QAM) of order 64 (i.e., 64-QAM), more than 400,000,000 likelihood values have to be combined. As a consequence, conventional approaches for assessing bit reliability are computationally complex in at least some situations and can become infeasible for practical systems, e.g., mobile devices.

SUMMARY

Accordingly, there is a need for a technique that assesses the reliability of bits received by means of a modulation symbol more efficiently in at least some situations.

According to one aspect, a method of assessing the reliability of bits received by means of a modulation symbol on a channel is provided. The method comprises the following steps performed at a receiving side of the channel: providing an input dataset including a plurality of input values corresponding to different transmit hypotheses according to a modulation alphabet used for encoding the bits in the symbol; a first computing step of computing a first intermediary dataset by combining the input values of the input dataset according to a first combination scheme; a second computing step of computing a second intermediary dataset by combining the input values of the input dataset according to a second combination scheme different from the first combination scheme; and assessing the reliability of the bits based on the first intermediary dataset and the second intermediary dataset.

By applying the first and second combination schemes to the input values, redundancy in the assessment of the reliability of different bits can be avoided by assessing the reliability of the bits based on the first and second intermediary datasets. In at least some implementations, the first and second combination schemes allow efficiently taking into account the different transmit hypotheses so that at least parts of the same first and second intermediary datasets are used for assessing the reliability of different bits.

A number of the values in each of the datasets may be a power of two. The number of input values used in a first iteration of the computing steps may be two to the power of the number of bits encoded in the symbol. The received symbol may be modulated according to a finite symbol alphabet. The input dataset used in the first iteration of the computation steps may include one input value for each element of the symbol alphabet.

The bits may be comprised in a bit sequence. The bit sequence may be encoded in the symbol according to a modulation scheme. Representing the bit sequence by means of the modulation symbol is also referred to as keying. Each transmit hypothesis for the symbol may correspond to one instance of the bit sequence. The transmit hypothesis may be a hypothesis for the symbol, optionally taking into account a channel state. Alternatively or in addition, the transmit hypothesis may be represented by the corresponding instance of the bit sequence or any other numerical value representing the bit sequence. Each of the transmit hypotheses may be indicative of a symbol of the modulation alphabet and/or an instance of the bit sequence.

The input dataset may include four parts, e.g., four consecutive parts of equal number of input values. The four parts of the input dataset may be mutually disjoint subsets of the input dataset.

The four parts of the input dataset may be combined according to the first combination scheme resulting in the first intermediary dataset. The first intermediary dataset may include a first part and a second part, e.g., two equally sized parts. The first and second parts of the first intermediary dataset may be consecutive parts of the first intermediary dataset. The two parts of the first intermediary dataset may be mutually disjoint. The first part of the first intermediary dataset may be computed based on a combination of the first part and the third part of the input dataset. The second part of the first intermediary dataset may be computed based on a combination of the second part and the fourth part of the input dataset.

The four parts of the input dataset may be combined according to the second combination scheme resulting in the second intermediary dataset. The second intermediary dataset may include a first part and a second part, e.g., two equally sized parts. The first and second parts of the second intermediary dataset may be consecutive parts of the second intermediary dataset. The two parts of the second intermediary dataset may be mutually disjoint. The first part of the second intermediary dataset may be computed based on a combination of the first part and the second part of the input dataset. The second part of the second intermediary dataset may be computed based on a combination of the third part and the fourth part of the input dataset.

At least one of the first computing step and the second computing step may be iterated. Each value in the datasets may be related to one or more of the transmit hypotheses for the symbol. Each value in the initial dataset of a first iteration may correspond to one of the transmit hypotheses for the symbol. The initial dataset of the first iteration and/or the intermediary datasets of a last iteration may include pairs of values corresponding to complementary transmit hypotheses for one of the bits encoded in the symbol.

The first computing step may be iterated so that the input dataset used in the iteration of the first computing step is the first intermediary dataset resulting from the previous first computing step. The second computing step may be iterated so that the input dataset used in the iteration of the second computing step is the first intermediary dataset resulting from the previous first computing step. Alternatively or in addition, the second computing step may be iterated so that the input dataset used in the iteration of the second computing step is the second intermediary dataset resulting from the previous second computing step.

The input dataset used in a first iteration of the computing steps (e.g., in a first instance of the computing steps as part of the iteration) may include one input value for each of the $2^J$ transmit hypotheses for the symbol. The exponent J may denote a number of the bits encoded in the symbol.

A number of intermediary datasets resulting from one iteration of the computing steps (e.g., from one instance of the computing steps as part of the iterations) may increase linearly with a number of the iterations (e.g., the number of instances of the computing steps as part of the iterations). In the n-th iteration of the first and second computing steps, n+1 intermediary datasets may be computed. In each of the iterations, the first computing step may be applied once. In the n-th iteration, the second computing step may be applied n times. The first computing step may be applied to only the first intermediary dataset of the previous iteration. The second computing step may be applied to each first and second intermediary datasets of the previous iteration. The iterations may terminate after the (J−1)-th iteration. The terminating iteration may result in J intermediary datasets. The intermediary datasets resulting from the terminating iteration are also referred to as terminating datasets. The J terminating datasets may include one first intermediary dataset and J−1 second intermediary datasets.

A number of values in each of the intermediary datasets resulting from one iteration of the computing steps (e.g., from one instance of the computing steps as part of the iterations) may decrease exponentially with the number of iterations (e.g., the number of instances of the computing steps as part of the iterations). Each iteration of the computing steps, e.g., each of the combinations, may halve the number of values in the datasets. In the n-th iteration of the first and second computing steps, the computed intermediary dataset may include $2^{J-n}$ values. Each of the J terminating datasets may include two output values. The two output values of the j-th intermediary dataset may correspond to complementary transmit hypotheses for the j-th bit.

The iteration may be terminated when the number of intermediary datasets computed in one iteration of the computing steps equals the number of bits. The reliability of the bits may be assessed individually for each of the bits. The reliability of each of the bits may be assessed based on a corresponding one of the terminating datasets. The reliability of some or all of the bits may be assessed based on a difference between the two output values in the corresponding one of the terminating datasets. Each of the first part and the second part of each of the terminating datasets may include one output value. The reliability may be assessed based on the difference between the first part and the second part.

Each value in each of the datasets may be indicative of at least one of a likelihood, a logarithm of the likelihood (which is referred to as a log-likelihood) and a Euclidean distance. The values in some or all of the datasets may be log-likelihood values. The difference may be a Log-Likelihood Ratio (LLR). The assessment may include computing one LLR for each of the bits. The LLRs may represent the reliability of the bits.

The combination may include a combination of values included in the corresponding parts. The combination may include at least one of applying a Jacobi logarithm, determining a minimum, determining a maximum and an approximation for any one thereof.

The channel may be a telecommunications channel, e.g., a telecommunications channel of a mobile telecommunications network, or a read-channel, e.g., a read-channel of a hard disc drive. The channel may include, at least partly, any one of a copper link, a wireless link, e.g., a microwave link, and fiber optics. The symbol may be optically emulated, e.g., using a 3-path interferometer. The channel may include a wired Digital Subscriber Line (DSL). The channel may be a MIMO channel. The symbol may include a symbol tuple including a symbol value for each spatial layer of the MIMO channel.

The method may further comprise the steps of receiving the symbol on the channel. Alternatively or in combination, the method may comprise the step of estimating a state of the channel. The channel state may be indicative of at least one of gain and noise variance on the channel.

The symbol may represent one or more points in a constellation space of the modulation. The symbol may be received via the MIMO channel. The symbol may represent one point in the constellation space of the modulation for each spatial layer or for each transmit antenna of the MIMO channel. Each transmit hypothesis according to the modulation alphabet may specify one point in the constellation space.

Each of the initial values used in the first iteration may be indicative of at least one of the Euclidean distance, the likelihood and the log-likelihood. The log-likelihood may be the logarithm of a conditional probability for the corresponding transmit hypothesis given the received symbol. The Euclidean distance may be indicative of a distance in a constellation space of the modulation. The distance may be the distance between the received symbol and the transmit hypothesis for the symbol. The Euclidean distance may take the channel gain estimate into account. The Euclidean distance may be normalized based on the noise variance estimate.

According to another aspect, a computer program product comprising program code portions for performing any one of above methods is provided. The computer program product may perform the method when the computer program product is executed on a computing device. The computing device may comprise at least one of a multiple-task processor and a dedicated demodulation processor. Furthermore, a computer-readable recording medium storing the computer program product is provided. The computer-readable recording medium may take the form of a semiconductor memory, an optical disc, a magnetic disc or any hybrid thereof.

According to a hardware aspect, a device for assessing the reliability of bits received by means of a symbol on a channel is provided. The device comprises a providing unit adapted to provide an input dataset including a plurality of input values corresponding to different transmit hypotheses according to a modulation alphabet used for encoding the bits in the symbol; a computing unit adapted to perform a first computing step of computing a first intermediary dataset by combining the input values of the input dataset according to a first combination scheme and a second computing step of computing a second intermediary dataset by combining the input values of the input dataset according to a second combination scheme different from the first combination scheme; and an assessing unit adapted to assess the reliability of the bits based on the first intermediary dataset and the second intermediary dataset.

Any one of the units of the device, or additional units of the device, may include features mentioned above in the context of the method aspect and/or may be adapted to perform any one of the steps mentioned above in the context of the method aspect.

BRIEF DESCRIPTION OF THE DRAWINGS

In the following, the disclosure is described in more detail with reference to exemplary embodiments illustrated in the drawings, wherein.

DETAILED DESCRIPTION

In the following description, for purposes of explanation and not limitation, specific details are set forth, such as specific device and system configurations and specific methods, steps and functions, in order to provide a thorough understanding of the technique presented herein. It will be appreciated by the skilled person that the technique may be practiced in other embodiments that depart from these specific details. While the embodiments are described in the context of a wireless telecommunications system, e.g., according to Universal Mobile Telecommunications System (UMTS) or Long Term Evolution (LTE), the technique can also be practiced in any other data processing system that demodulates a modulation symbol representing two or more bits. Such systems can include devices for receiving and/or storing data.

Those skilled in the art will further appreciate that the methods, steps and functions described herein may be implemented using individual hardware circuitry, using software functioning in conjunction with a programmed microprocessor or general purpose computer, using one or more Application Specific Integrated Circuits (ASICs), one or more Digital Signal Processors (DSPs) and/or one or more Field Programmable Gate Arrays (FPGAs). It will also be appreciated that the technique disclosed herein may be embodied in a processor and a memory coupled to the processor, wherein the memory stores one or more programs that perform the methods, steps and functions described herein when executed by the processor.

Figure 1:
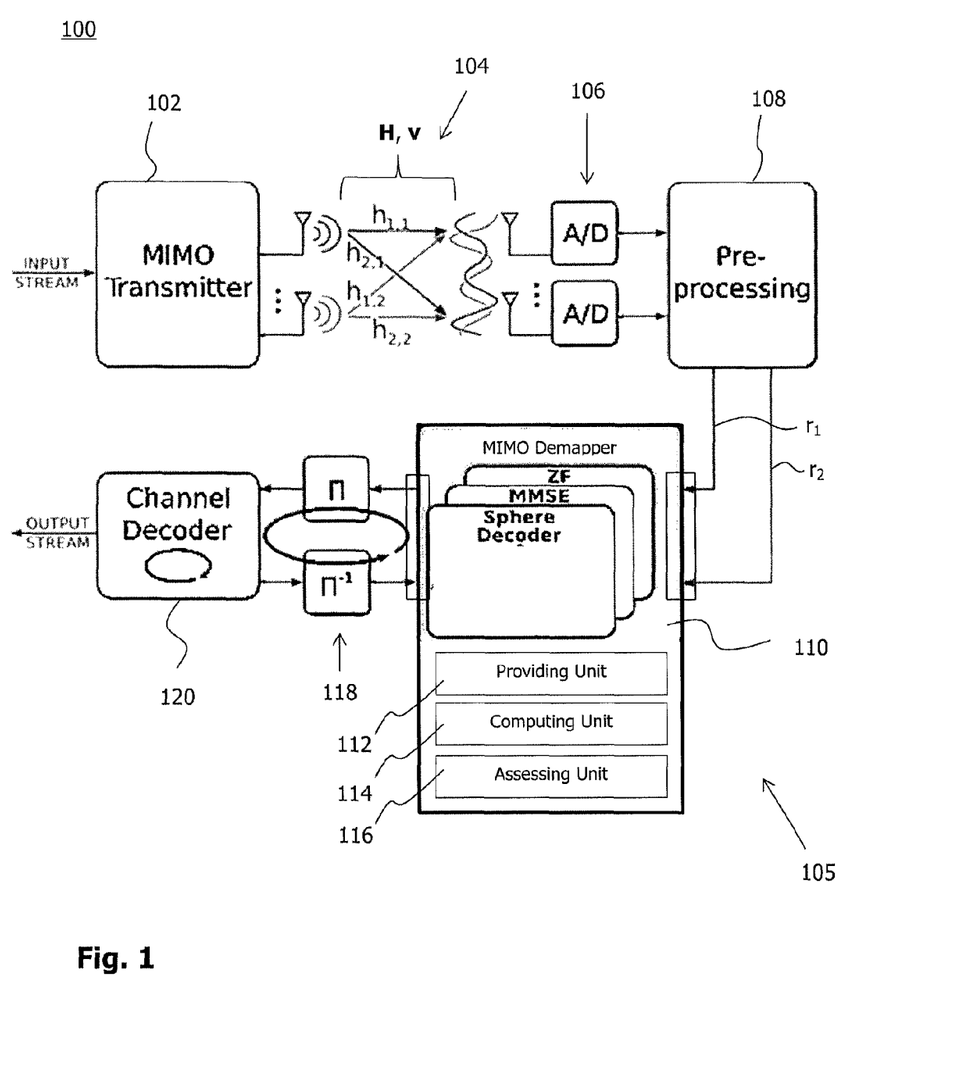
FIG. 1 is a schematic block diagram illustrating a wireless communication as an exemplary context for an embodiment of a device for assessing the reliability of received bits.

FIG. 1 is a schematic block diagram illustrating a wireless communication 100 from a transmitter 102 via a channel 104 to a receiver 105. Methods and devices described herein can be implemented at the side of the receiver 105. A base station of a telecommunications network and a mobile device can take the roles of the transmitter 102 and the receiver 105, respectively, or vice versa.

While FIG. 1 shows a unidirectional communication 100 for the clarity of the illustration, the technique is readily implemented for a bidirectional communication. Furthermore, while the communication 100 shown in FIG. 1 includes a Multiple Input Multiple Output (MIMO) channel 104, the technique is beneficially applied also for receiving data on a Multiple Input Single Output (MISO) channel or Single Input Single Output (SISO) channel.

The MIMO transmitter 102 includes a plurality of transmit antennas. Generally, the number of one or more transmit antennas is denoted by N (for values N=1, 2, . . . ). The receiver 105 includes M receive antennas (for values M=1, 2, . . . ). The signal received at each of the receive antennas is sampled in the time domain by means of an analog-to-digital converter 106. The digital signal of each of the receive antennas is subjected to a preprocessing unit 108. The preprocessing unit performs channel equalization by decorrelating different spatial layers transmitted via the MIMO channel 104 according to a channel gain, $H=(h_{1,1}, h_{1,2}, \ldots)$, and a channel noise variance, $v=(v_1, v_2)$. The channel gain H and the channel noise variance v define the channel state, which is periodically measured by the receiver 105 based on reference signals transmitted from the transmitter 102 via the channel 104.

The MIMO communication 100 shown in FIG. 1 includes two spatial layers. The symbol value $r_1$ received on the first spatial layer and the symbol value $r_2$ received on the second spatial layer are collectively referred to as a modulation symbol r. The modulation symbol is provided, e.g., in the form of a tuple, to a device 110 for assessing the reliability of bits, $b=(b_1, \ldots, b_j, \ldots, b_J)$, encoded in the modulation symbol r received via the channel 104. In the case of an SISO communication, the modulation symbol r may include only one symbol value.

The device 110 comprises a providing unit 112, a computing unit 114 and an assessing unit 116. The providing unit 112 provides one input value for each of the transmit hypotheses according to a modulation alphabet used for the encoding of the bits b in the symbol r. The computing unit computes first and second intermediary datasets based on the input values of the input dataset. The assessing unit 116 assesses the reliability of the bits b based on the first and second intermediary datasets.

The reliability of each of the bits b is expressed in terms of a Log-Likelihood Ratio (LLR), which is also referred to as a softbit. The softbits are subjected to a bit interleaver unit 118. The output of the bit interleaver 118 is still protected by a channel code used as a means of forward error correction on the channel 104. The channel decoder unit 120 optionally provides extrinsic information on the coded bits as a priori knowledge to the device 110. After successfully decoding, the channel decoder unit 120 provides an output stream that is equal to the input stream underlying the transmission.

The device 110 can be implemented in any context requiring the functionality of a soft-output demapper, which is also referred to as a soft-output joint detector in the case of more than one spatial layer. Combining-weight coefficients and gain coefficients can be computed according to a Zero Forcing (ZF) decoding approach, a Minimum Mean Square Error (MMSE) decoding approach or a Sphere decoding approach.

Figure 2:
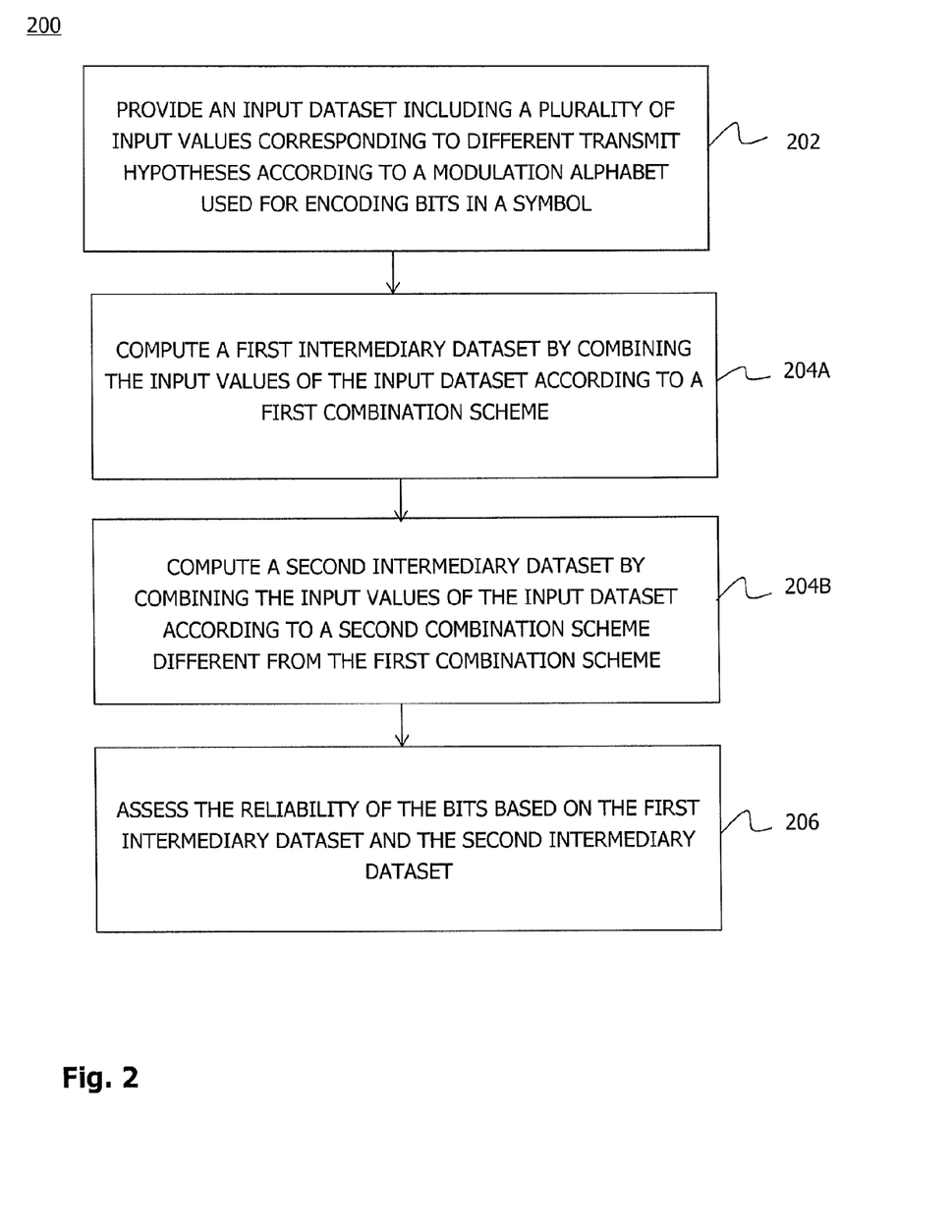
FIG. 2 is a flowchart illustrating an embodiment of a method that can be performed at a receiving side of the communication shown in FIG. 1.

FIG. 2 shows a flowchart illustrating a method embodiment for assessing the reliability of bits received by means of a modulation symbol on a channel. The method comprises the step 202 of providing an input dataset including a plurality of input values. The input dataset includes one input value for each transmit hypothesis of a modulation alphabet, which is used for encoding the bits in the modulation symbol.

The method 200 further comprises a first computing step 204A of computing a first intermediary dataset by combining the input values of the input dataset according to a first combination scheme. In a second computing step 204B, a second intermediary dataset is computed by combining the input values of the input dataset according to a second combination scheme, which is different from the first combination scheme. In a step 206 of the method 200, the reliability of the bits is assessed based on the first intermediary dataset and the second intermediary dataset.

The method 200 can be performed by the device 110 shown in FIG. 1. The steps 202, 204A and 204B, and 206 are performed by the units 112, 114, and 116, respectively.

Figure 3:
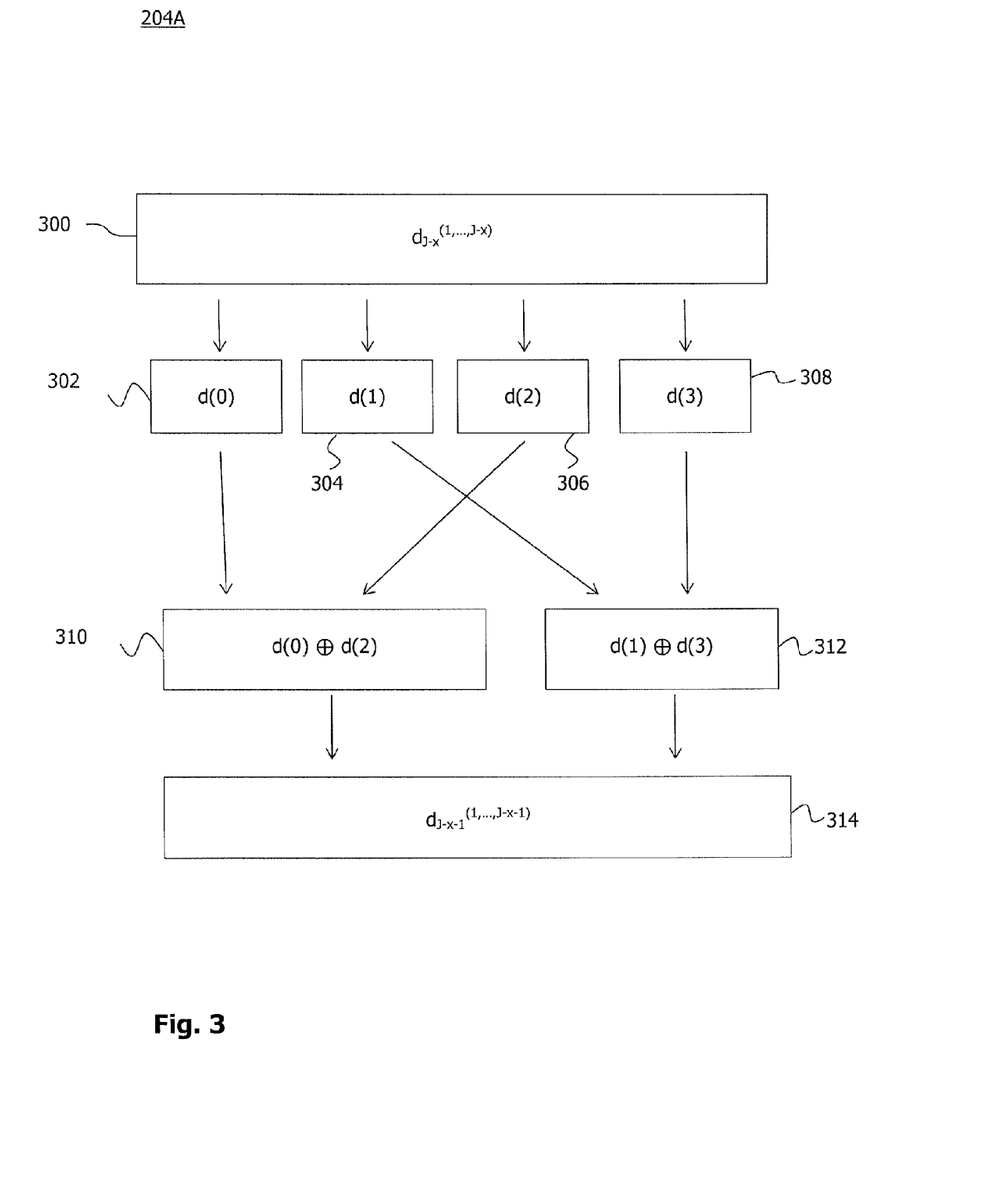
FIG. 3 schematically illustrates a first combination scheme applied in a computation step of the method shown in FIG. 2.

FIG. 3 is a flow chart schematically illustrating the first combination scheme applied by the computing unit 114 in the step 204A. The input dataset 300 is at least logically subdivided, e.g., by memory re-allocation or by means of pointers, into four equally sized subsequent parts 302, 304, 306 and 308. The first part 302 and the third part 306 are combined into a first part 310 of the first intermediary dataset 314. The second part 304 and the fourth part 308 of the input dataset 300 are combined into a second part 312 of the first intermediary dataset 314.

The input dataset 300 can be an initially provided input dataset $d_J^{(1, \ldots, J)}$ including $2^J$ input values, each of which is a log-likelihood value for one of the $2^J$ transmit hypotheses for the symbol r. In the notation of FIG. 3, the latter case corresponds to x=0. The input dataset 300 can also be the first intermediary dataset $d_{J-x}^{(1, \ldots, J-x)}$ resulting from a previous first computing step 204A. Here, x+1=1, 2, ... may correspond to a number of iterations of the first computation step 204A. As a result of applying the first computing step 204A, the size of the first intermediary dataset 314 is reduced by a factor of 2 compared to the initial size of $2^{J-x}$ input values.

Figure 4:
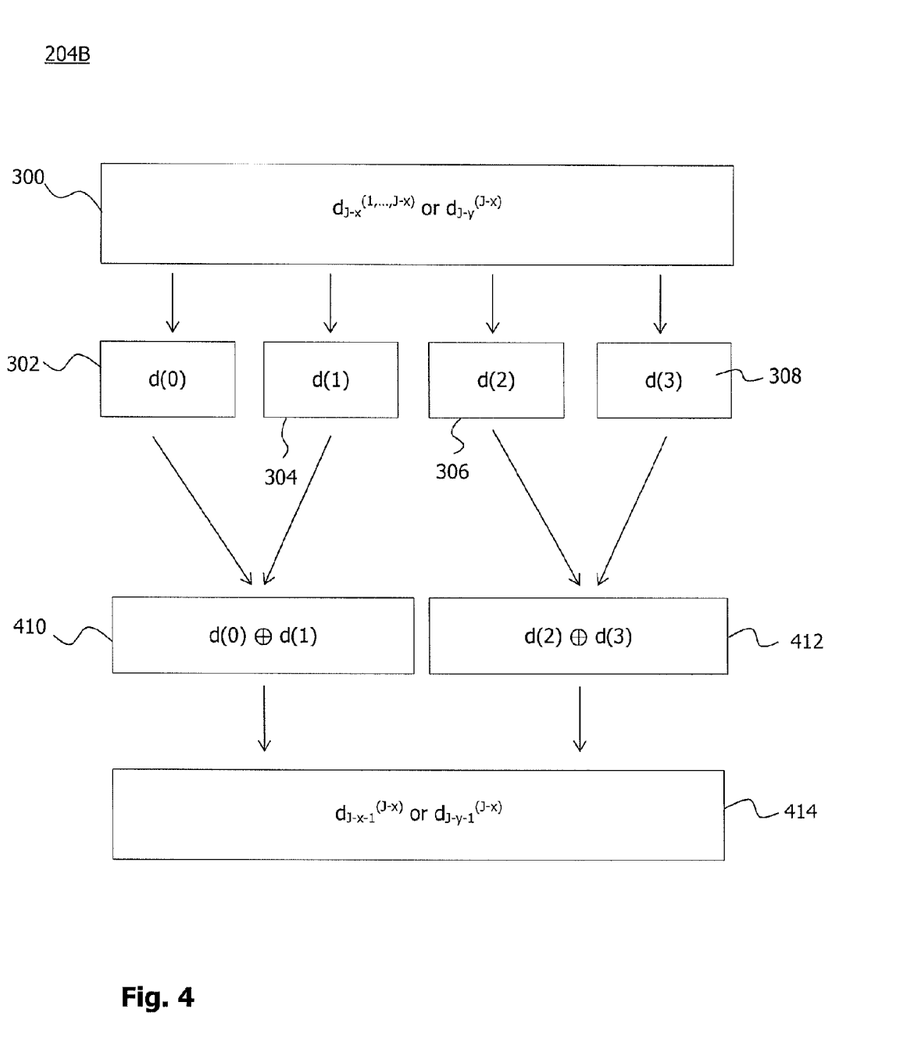
FIG. 4 schematically illustrates a second combination scheme applied in a computation step of the method shown in FIG. 2.

FIG. 4 is a flowchart schematically illustrating the second combination scheme applied in the second computing step 204B. The input dataset 300 is at least logically subdivided into four parts 302 to 308. The input dataset 300 of the form $d_{J-x}^{(1, \ldots, J-x)}$ (for x=0, 1, 2, ...) used in the first computing step 204A is also subjected to the second computation step 204B. In these cases, the logical subdivision is performed once for both the first computing step 204A and the second computing step 204B.

For further applications of the second computing step 204B when the input dataset 300 has the form $d_{J-y}^{(J-x)}$ for y>x (for x=0, 1, 2, ...), which input datasets 300 are not subjected to the first computing step 204A, the second computing step 204B includes a substep of subdividing the input dataset 300.

According to the second combination scheme, the first part 302 and the second part 304 of the input dataset 300 are combined into a first part 410 of the second intermediary dataset 414. The third part 306 and the fourth part 308 of the input dataset 300 are combined into a second part 412 of the second intermediary dataset 414.

The input dataset 300 used for the second computing step 204B can be any one of an initially provided input dataset $d_J^{(1, \ldots, J)}$, the result 314 of a previous first computing step 204A and the result 414 of a previous second computing step 204B. One application of the second computing step 204B reduces the size $2^{J-x}$ or $2^{J-y}$ of the input dataset 300 by a factor 2.

Figure 5:
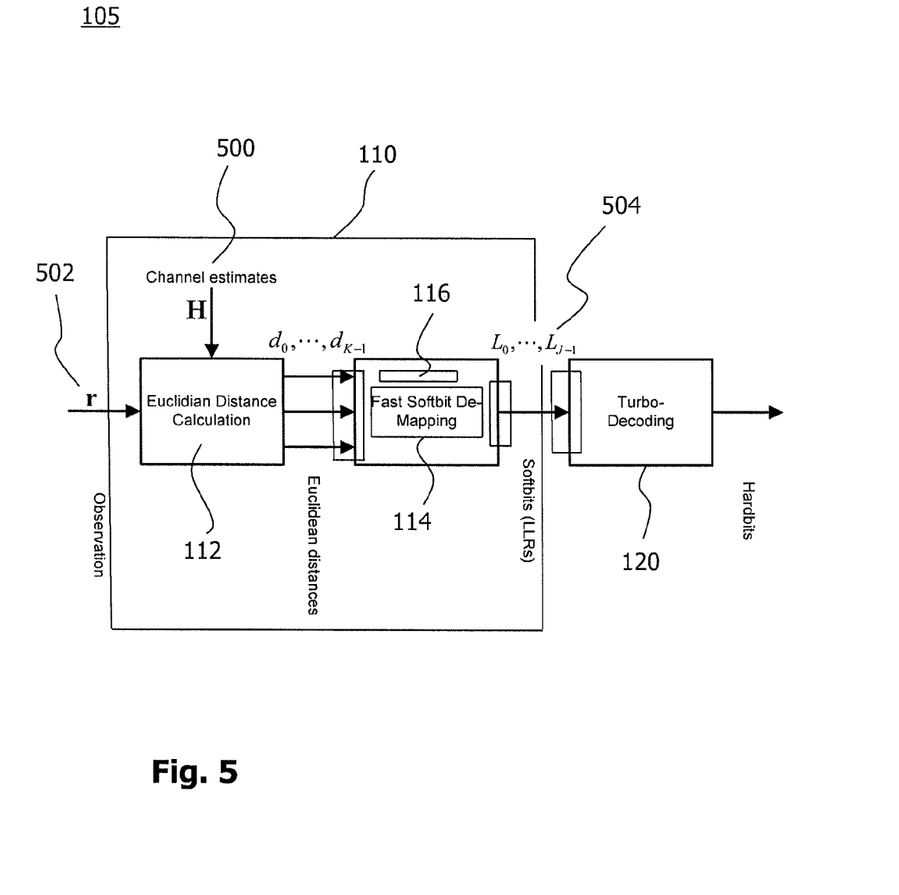
FIG. 5 is a schematic block diagram illustrating further details of the receiving side of the communication shown in FIG. 1.

FIG. 5 is a block diagram including further details of the receiving side 105. The device 110 is coupled to a turbo-decoding unit 120. The device 110 is provided with estimates 500 for the channel gain H and the variance $\sigma^2_v$ of the noise v, and the received symbol r indicated by reference sign 502.

For a general communication 100, the received modulation symbol, r, is related the transmitted modulation symbol, s, according to $$r = H \cdot s + v. \qquad (1)$$

The received symbol r is also referred to as observation at the receiver 105. In Eq. (1), $H \in \mathbb{C}^{M \times N}$ is a complex-valued matrix representing the channel gain. Each element $h_{m,n}$ of the matrix H represents the complex-valued channel gain from transmit antenna n (for n=1, ..., N) to receive antenna m (for m=1, ..., M).

The transmitted symbol $s \in \mathcal{A}^N$ is the complex-valued signal assigned to the bits b according to the modulation. The set $\mathcal{A}$ represents the finite symbol alphabet of the modulation, such as QPSK, 16-QAM or 64-QAM. Due to the finiteness of the modulation alphabet and the finite number M of receive antennas, the transmitted signal s can be represented as a symbol vector in a finite-dimensional discrete vector space. Note that the logarithm of basis 2 (denoted by $\log_2$) of the cardinality of set $\mathcal{A}^N$ corresponds to the number, J, of bits carried by the transmitted symbol s and the received symbol r.

The last term in Eq. (1), $v \in \mathbb{C}^M$, represents the complex-valued noise introduced by the channel 104. The components of the noise have zero mean and are independent identically-distributed Gaussian noise, i.e. $\sim \mathcal{CN}(0, \sigma_v^2 \cdot I_M)$. The variance, $\sigma_v^2$, is the mean energy of each noise sample. Herein, $I_M$ denotes the identity matrix of size M.

The providing unit 112 is implemented by a Euclidean distance calculation unit. The providing unit 112 computes Euclidean distances, which define the input values, $d_k$, in the initial input dataset 300, $d_J^{(1, \ldots, J)}$, according to $$d_k = \|H \cdot s_k - r\|_2^2 / \sigma_v^2, \quad (2)$$

wherein the denominator normalizes the Euclidean distance with respect to the estimated noise variance. Consequently, the initial input dataset 300 includes $2^J$ Euclidean distances between the observation r and the transmit hypothesis, $H \cdot s_k$, for $k=1, \ldots, 2^J$. By way of example, for a 2×2 MIMO communication 100 (i.e., N=2) with QPSK modulation (i.e., $|\mathcal{A}|=2^2$), each modulation symbol is carrying a sequence of $J = N \cdot \log_2 |\mathcal{A}| = 4$ bits. The hypothesis subscript, k, uniquely indicates the bit sequence $b_k$ keyed by the hypothetical symbol $s_k$ via "decimal to binary number conversion". E.g., the bit sequence $b_k$ associated to k=3 is $b_3 = (0,0,1,1)$.

Since Gaussian noise has been assumed, the Euclidean distance between the received symbol 502, r, and the transmit hypothesis, $H \cdot s_k$, equals the log-likelihood for the transmit hypothesis. The likelihood is a conditional probability for the transmitted symbol s being $s_k$ (which corresponds to the bit sequence b being $b_k$) given the channel state 500, H, and the received symbol r.

As a preparation for the turbo-decoding unit 120, the receiver 105 has to derive soft values 504 that represent the assessment as to the reliability of each of the transmitted bits. In one implementation, the magnitude of the softbits 504 represents the reliability and the sign of the softbit 504 points to the most likely decision for the corresponding one of the bits being either 0 or 1. In the implementation shown in FIG. 5, the softbits 504 are so-called Log-Likelihood Ratios (LLRs) that satisfy the needs of the turbo-decoding unit 120. The LLR for the j-th bit, $b_j$, is denoted by $L_j$.

Conventionally, the LLR of bit $b_j$ is computed according to $$L_{j,APP} = \log\left(\sum_{k \in \mathcal{B}_j} P\{s_k | r\}\right) - \log\left(\sum_{\ell \in \bar{\mathcal{B}}_j} P\{s_\ell | r\}\right) \quad (3)$$

$$= \log\left(\sum_{k \in \mathcal{B}_j} \exp(-d_k)\right) - \log\left(\sum_{\ell \in \bar{\mathcal{B}}_j} \exp(-d_\ell)\right),$$

wherein the set $\underline{\mathcal{B}}_j$ contains all indices of symbol hypotheses with bit $b_j = 0$, whereas the set $\bar{\mathcal{B}}_j$ contains the complementary set of indices for the counter hypotheses with bit $b_j = 1$. By means of the Jacobi logarithm, $$-\log(\exp(-a) + \exp(-b)) = \min(a,b) + \log(1 + \exp(-|a-b|)), \quad (4)$$

Eq. (3) can be recursively calculated, i.e., the logarithm of the sum having $K = 2^J$ exponential summands requires $K/2 - 1$ executions of Eq. (4). Due to the logarithm term within Eq. (4), the calculation of LLRs is computationally expensive. A good approximation with significantly reduced computational complexity can be attained by the so-called "max-log" approximation:

$$L_{j,MAX-LOG} \approx \log\left(\max_{k \in \mathcal{B}_j} P\{s_k | r\}\right) - \log\left(\max_{\ell \in \bar{\mathcal{B}}_j} P\{s_\ell | r\}\right). \quad (5)$$

$$\approx \min_{\ell \in \bar{\mathcal{B}}_j} d_\ell - \min_{k \in \mathcal{B}_j} d_k$$

Similar to Eq. (4), the max-log approximation of LLRs can be recursively calculated by $$-\log(\exp(-a) + \exp(-b)) \approx \min(a,b). \quad (6)$$

However, the conventional computation becomes infeasible as the number, J, of bits encoded in one modulation symbol (denoted by s on the transmitting side and r on the receiving side) increases. Let $K = |\mathcal{A}^N| = 2^J$ be the cardinality of the symbol set, $\mathcal{A}^N$. In other words, K is the number of transmit hypotheses $H \cdot s_k$ for $k=1, \ldots, K$. The number of bits keyed by the symbol is related to K by $J = \log_2 K = N \cdot \log_2 |\mathcal{A}|$. Hence, in order to obtain LLRs (using the combination APP or MAX-LOG), Eq. (4) or Eq. (6) has to be carried out $(J \cdot (2^J - 2))$ times, i.e., the complexity of the conventional computation is of order $O(J \cdot (2^J - 2))$. For example, for a 4×4 MIMO system (i.e., N=4) with 64-QAM (i.e., $|\mathcal{A}|=64$), this number is 402,653,136. This example should point out that the computational effort for the conventional approach might become very huge and not feasible for practical systems. As opposed to the conventional computation, the method 200 performed by the device 110 significantly reduces the computational complexity without reducing the numerical accuracy of the computation, as is described in what follows.

The device 110 and the method 200 are suitable for using in the computing steps 204A and 204B the APP value combination, the MAX-LOG approximate value combination or any other value combination for soft-output demapping. In an advanced embodiment, the value combination used in the computing steps 204A and 204B is a mixture of APP and MAX-LOG.

The following notation is used for a clear presentation of the technique. The value combination is symbolized by an operator $\oplus$. The $\oplus$-operator for the Jacobi logarithm according to Eq. (4), i.e., for the APP value combination, is denoted by "$\oplus_{APP}$". The $\oplus$-operator for the min-operation according to Eq. (6), i.e., for the MAX-LOG value combination, is denoted by "$\oplus_{MAX-LOG}$". More specifically, the operators are defined by $$a \oplus_{APP} b = \min(a,b) + \log(1 + \exp(-|a-b|)) \text{ and}$$

$$a \oplus_{MAX-LOG} b = \min(a,b). \quad (7)$$

When applied onto a pair of datasets including a plurality of values, the value combination operator $\oplus$ is to be understood as a value-wise combination, e.g., $a \oplus b = [a_0 \oplus b_0, \ldots, a_K \oplus b_K]^T$.

Since the technique is independent of any details of the value combination, such as the details specified by Eq. (7), the technique is presented most clearly without a subscript "APP", "MAX-LOG" or any other specification of the detailed combination at the value-level.

Furthermore, a multiplicative operator denoted by "⊗" is used for conveniently explaining the technique. The ⊗-operator yields a dataset by relating a dataset and a matrix according to:

$$\begin{bmatrix} a_{0,0} & \cdots & a_{0,N} \\ \vdots & \square & \vdots \\ a_{M,0} & \cdots & a_{M,N} \end{bmatrix} \otimes \begin{bmatrix} b_0 \\ \vdots \\ b_N \end{bmatrix} = \begin{bmatrix} a_{0,0} \cdot b_0 \oplus \cdots \oplus a_{0,N} \cdot b_N \\ \vdots \\ a_{M,0} \cdot b_0 \oplus \cdots \oplus a_{M,} \cdot b_N \end{bmatrix}. \quad (8)$$

The calculation of J softbits associated to the received modulation symbol r can be rewritten using the following two step approach.

In a first step, let $\underline{c}_j$ denote the left term in Eq. (3) and Eq. (5) for the exemplary value combinations APP and MAX-LOG, respectively:

$$\underline{c}_{j,APP} = -\log\left(\sum_{k \in \mathcal{B}_j} \exp(-d_k)\right) \text{ or } \underline{c}_{j,MAX-LOG} = \min_{k \in \mathcal{B}_j} d_k. \quad (9)$$

The value $\underline{c}_j$ bears the information of the LLR $L_j$ with regard to all distances with $b_j=0$. Its counterpart is denoted by $\bar{c}_j$, examples of which are:

$$\bar{c}_{j,APP} = -\log\left(\sum_{\ell \in \bar{\mathcal{B}}_j} \exp(-d_\ell)\right) \text{ or } \bar{c}_{j,MAX-LOG} = \min_{\ell \in \bar{\mathcal{B}}_j} d_\ell. \quad (10)$$

Subsequently, the subscript (such as "APP" or "MAX-LOG") specifying the detailed value combination is avoided, since the presented technique is not limited to a specific value combination. Moreover, $c_{1,\ldots,J}$ is defined to be the tuple of size 2J stacking all terms $\underline{c}_j$ and $\bar{c}_j$ associated to received modulation symbol r, e.g., $$c_{1,\ldots,J}=[\underline{c}_1,\bar{c}_1,\ldots,\underline{c}_j,\bar{c}_j,\ldots,\underline{c}_J,\bar{c}_J]^T. \quad (11)$$

The initial input dataset d of size $K=2^J$ includes the sorted distances associated to received modulation symbol r as input values, e.g., $$d_j^{(1,\ldots,J)}=[d_0,\ldots,d_k,\ldots,d_K]^T. \quad (12)$$

In order to identify and eliminate redundancy in the conventional computation, an indicator matrix, $F_J$, of rank J consisting of zeroes and ones is used. It is emphasized that above operators and the indicator matrix explain the technique and can be implemented in an embodiment of the technique. However, the operators and/or the indicator matrix are not mandatory features of the technique.

The element $f_{2j-1,k}$ of $F_J$ equals 0, if the k-th transmit hypothesis is keying $b_j=0$. The element $f_{2j-1,k}$ of $F_J$ equals 1, if the k-th transmit hypothesis is keying $b_j=1$. The element $f_{2j,k}$ equals 1, if the k-th transmit hypothesis is keying $b_j=0$. The element $f_{2j,k}$ equals 0, if the k-th transmit hypothesis is keying $b_j=1$. In other words, $f_{2j-1,k}$ equals the bit $b_j$ of the bit sequence $b_k$. And $f_{2j,k}$ equals the inverted bit $b_j$ of the bit sequence $b_k$. For example, the indicator matrix for rank J=3 is given by $$F_3 = \begin{bmatrix} 0 & 1 & 0 & 1 & 0 & 1 & 0 & 1 \\ 1 & 0 & 1 & 0 & 1 & 0 & 1 & 0 \\ 0 & 0 & 1 & 1 & 0 & 0 & 1 & 1 \\ 1 & 1 & 0 & 0 & 1 & 1 & 0 & 0 \\ 0 & 0 & 0 & 0 & 1 & 1 & 1 & 1 \\ 1 & 1 & 1 & 1 & 0 & 0 & 0 & 0 \end{bmatrix}. \quad (13)$$

Using the operators and the indicator matrix $F_J$, the tuple $c_{1,\ldots,J}$ can be expressed by $$c_{1,\ldots,J}=F_J \otimes d_J^{(1,\ldots,J)}. \quad (14)$$

In a second step, the LLRs are determined based on the tuple by means of subtraction in the step 206 according to:

$$L_j = \underline{c}_j - \bar{c}_j. \quad (15)$$

Apparently, the indicator matrix $F_J$ has a regular structure. Therefore, the indicator matrix allows identifying the redundancy in the conventional computation. By decomposing the indicator matrix, the redundancy is eliminated, resulting in the efficient computation of the method 200. As pointed out before, the decomposition of the indicator matrix $F_J$ illustrates the technique and can be implemented in an embodiment of the technique. Implementing the decomposition is, however, not mandatory for realizing the technique according to the device 110 and the method 200.

The decomposition illustrates how to breaking down the large number of unrelated computation steps in the conventional computation into a number of smaller and efficiently interrelated computing steps 204A and 204B. The indicator matrix $F_J$ is decomposed until it cannot be divided any further when identity matrices of size 2 have been reached.

A recursive decomposition rule for the indicator matrix $F_J$ and for an auxiliary matrix $G_J$ is defined. Let $F_J(0)$ and $F_J(1)$ denote the equally sized left and right parts of indicator matrix $F_J$ so that $F_J=[F_J(0) \ F_J(1)]$. Correspondingly, $G_J(0)$ and $G_J(1)$ denote the left and right parts of the auxiliary matrix $G_J=[G_J(0) \ G_J(1)]$. Furthermore, the "atomic", i.e. not further divisible, base elements are defined by $F_1=G_1=I_2$, wherein $I_2$ is the identity matrix of size 2.

The indicator matrix $F_J$ of rank J is recursively decomposed into an indicator matrix of rank J−1 by $$F_J = \begin{bmatrix} F_{J-1}(0) & F_{J-1}(1) & F_{J-1}(0) & F_{J-1}(1) \\ G_{J-1}(0) & G_{J-1}(0) & G_{J-1}(1) & G_{J-1}(1) \end{bmatrix}, \quad (16)$$

and the auxiliary matrix $G_J$ is recursively decomposed by $$G_J=[G_{J-1}(0)G_{J-1}(0)G_{J-1}(1)G_{J-1}(1)]. \quad (17)$$

Figure 6:
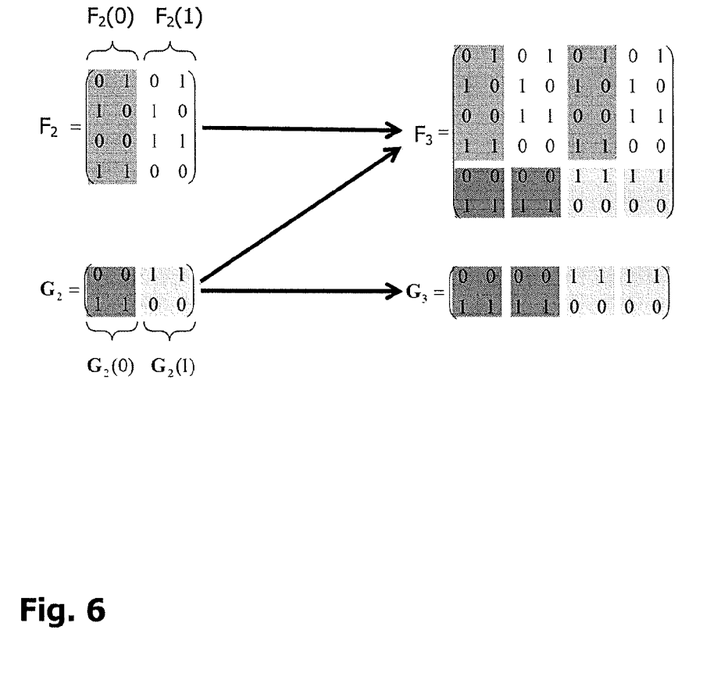
FIG. 6 schematically illustrates decomposition rules for matrices related to the computation step shown in FIG. 2.

While Eqs. (16) and (17) have been written for decomposing rank J-matrices into matrices of rank J−1, the decomposition rule holds for any rank j=1, ..., J. FIG. 6 shows an example of the recursive decomposition rule. The arrows in FIG. 6 indicate a corresponding recursive composition.

Using relation of Eq. (16), the Eq. (14) is rewritten as $$\begin{bmatrix} c_{1,\ldots,J-1} \\ c_J \end{bmatrix} = \begin{bmatrix} F_{J-1}(0) & F_{J-1}(1) & F_{J-1}(0) & F_{J-1}(1) \\ G_{J-1}(0) & G_{J-1}(0) & G_{J-1}(1) & G_{J-1}(1) \end{bmatrix} \otimes \begin{bmatrix} d_J^{(1,\ldots,J)}(0) \\ d_J^{(1,\ldots,J)}(1) \\ d_J^{(1,\ldots,J)}(2) \\ d_J^{(1,\ldots,J)}(3) \end{bmatrix}. \quad (18)$$

wherein $d_J^{(1,\ldots,J)}(0), \ldots, d_J^{(1,\ldots,J)}(3)$ is the partitioning of $d_J^{(1,\ldots,J)}$ into the 4 equally sized parts 302 to 308. Hence, the upper part of Eq. (18) can be compactly summarized by $$c_{1,\ldots,J-1} = \underbrace{[F_{J-1}(0)F_{J-1}(1)]}_{F_{J-1}} \otimes \underbrace{\begin{bmatrix} d_J^{(1,\ldots,J)}(0) \oplus d_J^{(1,\ldots,J)}(2) \\ d_J^{(1,\ldots,J)}(3) \oplus d_J^{(1,\ldots,J)}(1) \end{bmatrix}}_{d_{J-1}^{(1,\ldots,J-1)}}. \quad (19)$$

The combination for the dataset d in Eq. (19) is the first combination scheme applied in the step 204A. The lower part of Eq. (18) can be summarized by $$c_J = \underbrace{[G_{J-1}(0)G_{J-1}(1)]}_{G_{J-1}} \otimes \underbrace{\begin{bmatrix} d_J^{(1,\ldots,J)}(1) \oplus d_J^{(1,\ldots,J)}(0) \\ d_J^{(1,\ldots,J)}(2) \oplus d_J^{(1,\ldots,J)}(3) \end{bmatrix}}_{d_{J-1}^{(J)}}. \quad (20)$$

The combination for the dataset d in Eq. (20) is the second combination scheme applied in the step 204B. After the first decomposition according to Eq. (20), the iterated application of the decomposition rule for the auxiliary matrix according to Eq. (20) leads to a different kind of sub-problem, which is of the type $$c_{J-x} = G_{J-y} \otimes d_{J-y}^{(J-x)}. \quad (21)$$

This second type corresponds to applying the second computing step 204B to an input dataset $d_{J-y}^{(J-x)}$ for y>x. By means of the relation according to Eq. (17), Eq. (21) is rewritten as $$c_{J-x} = [G_{J-y-1}(0)G_{J-y-1}(0)G_{J-y-1}(1)G_{J-y-1}(1)] \otimes \begin{bmatrix} d_{J-y}^{(J-x)}(0) \\ d_{J-y}^{(J-x)}(1) \\ d_{J-y}^{(J-x)}(2) \\ d_{J-y}^{(J-x)}(3) \end{bmatrix} \quad (22)$$

which leads to the second combination scheme for $d_{J-y}^{(J-x)}$:

$$c_{J-x} = \underbrace{[G_{J-y-1}(0)G_{J-y-1}(1)]}_{G_{J-y-1}} \otimes \underbrace{\begin{bmatrix} d_{J-y}^{(J-x)}(0) \oplus d_{J-y}^{(J-x)}(1) \\ d_{J-y}^{(J-x)}(2) \oplus d_{J-y}^{(J-x)}(3) \end{bmatrix}}_{d_{J-y-1}^{(J-x)}} \quad (23)$$

At each level of the decomposition process, there is a unique correspondence to the desired result $\underline{c}_j$ and $\overline{c}_j$, for which reason the decomposition of the indicator matrix and/or the processing of the datasets can be implemented recursively or iteratively.

Figure 7:
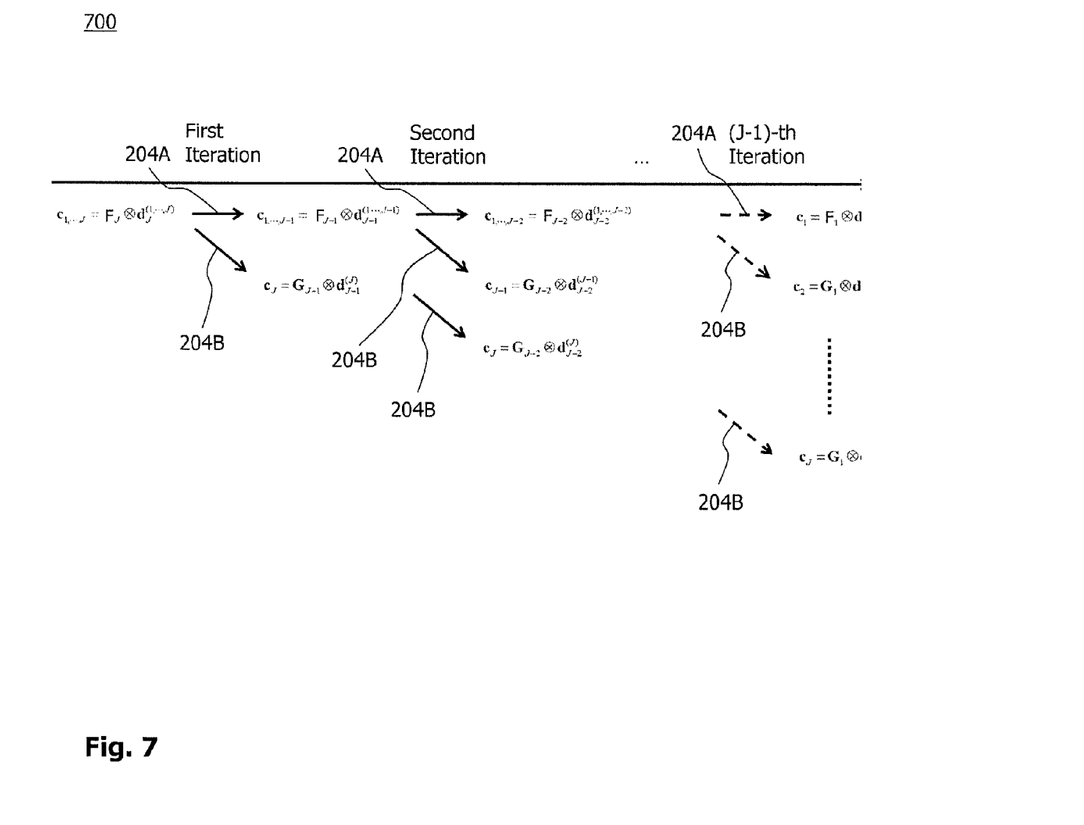
FIG. 7 schematically illustrates iterations of the rules shown in FIG. 6.

FIG. 7 illustrates a sequence 700 of iterations of the computing steps 204A and 204B. The computing steps 204A and 204B only have to operate on the datasets d to arrive at the desired pairs of values, $c_j$, which are subtracted in the step 206 to arrive at the LLR of the j-th bit. It is possible, but not necessary, to implement the decomposition of the matrices F and G.

After the last iteration, which is the (J−1)-th iteration shown on the right of FIG. 7, the pairs of values $c_j$ are equal to the J datasets $d_{(1)}^{(j)}$ for j=1, . . . , J. After the J-th matrix decomposition, the matrices cannot be split any further.

Figure 8:
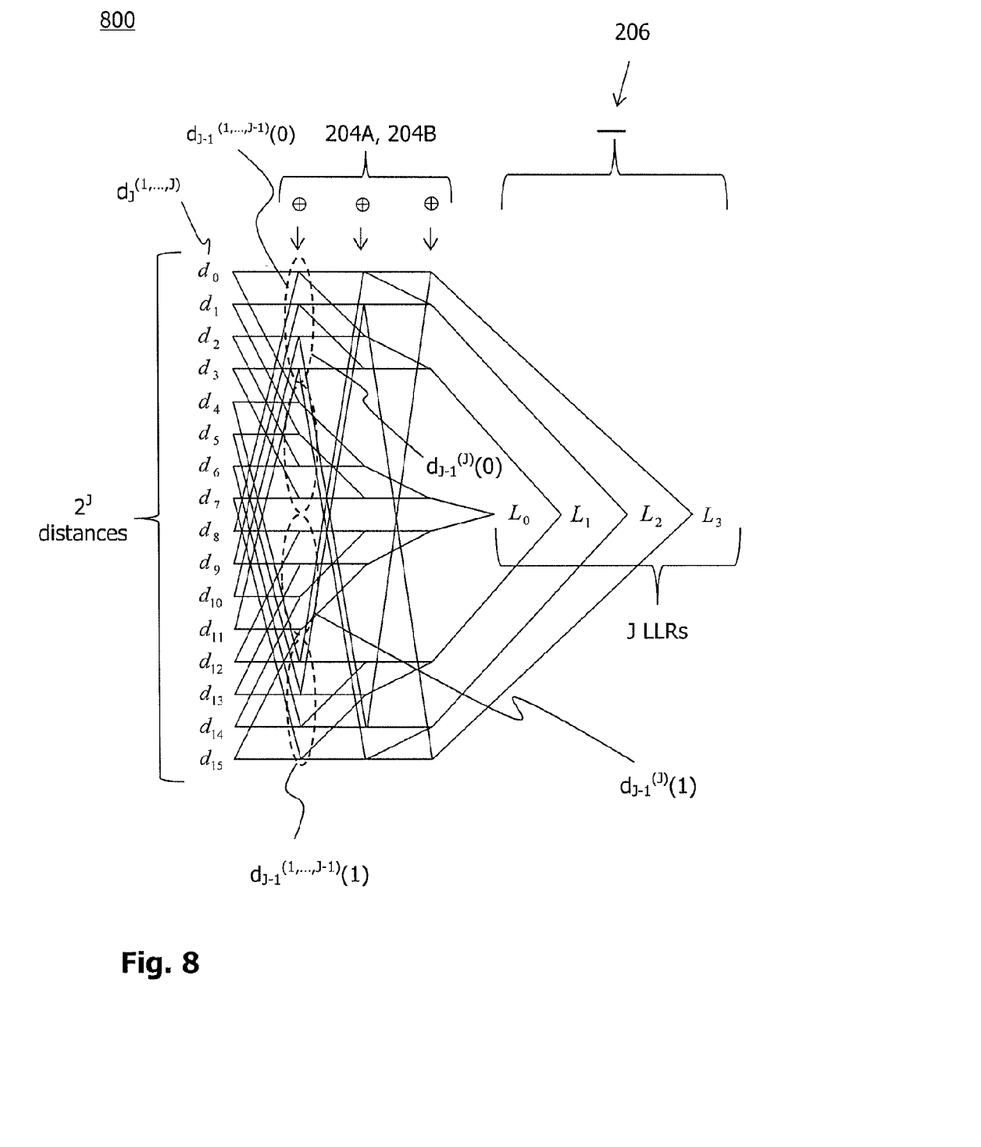
FIG. 8 schematically illustrates a data flow resulting from the method shown in FIG. 2.

FIG. 8 graphically illustrates a data flow 800 for the datasets d caused by the method 200. FIG. 8 shows an example for J=4 bits. The data flow 800 starts on the left with the initial input dataset $d_J^{(1,\ldots,J)}$, which includes the complete set of Euclidian distances $d_k$ as the input data values, e.g. according to Eq. (2).

The merging of two lines in the graph indicates an operation between the pair of values represented by the two lines. The corresponding operation is indicated at the top line of the graph, which is either the ⊕-operation for the combination in the steps 204A and 204B, or the (−)-operation for the subtraction in the step 206. Each of the arrows pointing downwards indicates one iteration including one application of the step 204A and one or more applications of the step 204B.

On the right of FIG. 8, the output values of the last iteration are subtracted. The subtraction 206 yields the desired LLRs, $L_j$, for each of the 4 bits keyed in the modulation symbol s by the transmitter 102.

For a sequence of J bits, the symbol alphabet comprises at least $2^J$ symbols so that the likelihood values of $2^J$ symbol hypotheses have to be taken into account for computing the reliability of one bit. Consequently, assessing the reliability of all 3 bits has a computational complexity that scales approximately as $J \cdot 2^J$.

The reduction of the computation complexity achieved by at least some implementations of the technique is exemplified. A comparison of the computation complexity of the conventional computation and the computation according to the method 200 by means of the device 110 is given in below Table.

| Number of bits encoded in the modulation symbol s | Number of ⊕-operations in the conventional computation | Number of ⊕-operations of the presented technique | Reduction in computational complexity |
| --- | --- | --- | --- |
| J = 4 (e.g., 2xQPSK) | 56 | 36 | 35.71% |
| J = 8 (e.g., 2x16QAM) | 2032 | 748 | 63.19% |
| J = 12 (e.g., 2x 64-QAM) | 49128 | 12260 | 75.04% |
| J = 24 (e.g., 4x 64-QAM) | 402653136 | 50331596 | 87.50% |

The second column in above Table evaluates the formula $\Sigma_{j=1}^{J-1}(j+1)2^{J-j}$ for the number of value combinations. The third column shows the percentage value corresponding to $J/2\Sigma_{j=32}^{J-1}2^{J-j}$.

A significant reduction of the computational complexity is achieved. The reduction enables mobile implementation not feasible otherwise and/or increases battery runtime. The reduction becomes even the more significant the more bits are encoded per modulation symbol. The latter is particularly valuable for modern telecommunications standards, including LTE.

In accordance with common terminology, in case of a "scalar" modulation symbol of size equal to one, the presented technique can be implemented as a softbit demapper. For any "vector" modulation symbol of size above one, the technique can be implemented as a soft-output joint detector. Moreover, the technique is readily extended towards a post-processing unit for list sphere decoders.

The structure of the presented technique is well suited for parallel processing and pipelining. Consequently, it enables processing even a complete "vector" modulation symbol per cycle.

Furthermore, a device using a hybrid value combination including both MAX-LOG and APP can be readily realized. For example, a tendency of high Hamming distances between pairs of "vector" modulation symbols to be processed within first cycles (say the first 2 or 5 cycles) has been observed. Consequently, a hybrid device can beneficially employ a min-operation (e.g., according to Eq. (4)) within the first cycles and subsequently use a Jacobi logarithm (e.g., according to Eq. (6)) for the value combination.

Moreover, the iterations can be stopped before the (J−1)-th iteration for assessing the reliability of groups of bits in correspondence to a soft-input structure of a decoder downstream of the demapper.

As has become apparent by above exemplary embodiments, at least some implementations of the technique significantly reduce the computational complexity for assessing the reliability of individual bits encoded in a modulation symbol. The reduction in computational complexity is in particular significant for high-order modulation schemes and/or MIMO channels.

The invention claimed is:

1. A method of assessing the reliability of bits received via a modulation symbol on a channel, the method performed by a receiver comprising a processor at a receiving side of the channel, the method comprising:
receiving, by the receiver, a Multiple Input Multiple Output (MIMO) signal stream comprising different transmit hypotheses according to a modulation alphabet used for encoding the bits in the modulation symbol;
determining by the processor, from the MIMO signal stream that was received, an input dataset including a plurality of input values corresponding to the different transmit hypotheses according to the modulation alphabet used for encoding the bits in the modulation symbol;
first computing, by the processor, of a first intermediary dataset by combining the input values of the input dataset according to a first combination scheme;
second computing, by the processor, of a second intermediary dataset by combining the input values of the input dataset according to a second combination scheme different from the first combination scheme; and
assessing, by the processor, the reliability of the bits based on the first intermediary dataset and the second intermediary dataset,
wherein the combining the input values of the input dataset includes at least one of applying a Jacobi logarithm, determining a minimum, determining a maximum or determining an approximation thereof.

2. A method of assessing the reliability of bits received via a modulation symbol on a channel, the method performed by a receiver comprising a processor at a receiving side of the channel, the method comprising:
receiving, by the receiver, a Multiple Input Multiple Output (MIMO) signal stream comprising different transmit hypotheses according to a modulation alphabet used for encoding the bits in the modulation symbol;
determining, by the processor, from the MIMO signal stream that was received, an input dataset including a plurality of input values corresponding to the different transmit hypotheses according to the modulation alphabet used for encoding the bits in the modulation symbol;
first computing, by the processor, of a first intermediary dataset by combining the input values of the input dataset according to a first combination scheme;
second computing, by the processor, of a second intermediary dataset by combining the input values of the input dataset according to a second combination scheme different from the first combination scheme; and
assessing, by the processor, the reliability of the bits based on the first intermediary dataset and the second intermediary dataset,
wherein the first computing comprises computing the first intermediary dataset including a first part and a second part,
wherein the first part of the first intermediary dataset is based on a combination of a first part and a third part of the input dataset, and
wherein the second part of the first intermediary dataset is based on a combination of a second part and a fourth part of the input dataset.

3. A method of assessing the reliability of bits received via a modulation symbol on a channel, the method performed by a receiver comprising a processor at a receiving side of the channel, the method comprising:
receiving, by the receiver, a Multiple Input Multiple Output (MIMO) signal stream comprising different transmit hypotheses according to a modulation alphabet used for encoding the bits in the modulation symbol;
determining, by the processor, from the MIMO signal stream that was received, an input dataset including a plurality of input values corresponding to the different transmit hypotheses according to the modulation alphabet used for encoding the bits in the symbol;
first computing, by the processor, of a first intermediary dataset by combining the input values of the input dataset according to a first combination scheme;
second computing, by the processor, of a second intermediary dataset by combining the input values of the input dataset according to a second combination scheme different from the first combination scheme; and
assessing, by the processor, the reliability of the bits based on the first intermediary dataset and the second intermediary dataset,
wherein the second computing comprises computing the second intermediary dataset including a first part and a second part,
wherein the first part of the second intermediary dataset is based on a combination of the first part and the second part of the input dataset, and
wherein the second part of the second intermediary dataset is based on a combination of the third part and the fourth part of the input dataset.

4. The method of claim 1, wherein at least one of the first computing or the second computing is iterated.

5. The method of claim 1, wherein the first computing is iterated so that the input dataset used in the iteration of the first computing is the first intermediary dataset resulting from a previous first computation.

6. The method of claim 1, wherein the second computing is iterated so that the input dataset used in the iteration of the second computing is the first intermediary dataset resulting from a previous first computation.

7. The method of claim 1, wherein the second computing is iterated so that the input dataset used in the iteration of the second computing is the second intermediary dataset resulting from a previous second computation.

8. The method of claim 4, wherein each value in the input dataset of a first iteration corresponds to one of the transmit hypotheses for the modulation symbol.

9. A method of assessing the reliability of bits received via a modulation symbol on a channel, the method performed by a receiver comprising a processor at a receiving side of the channel, the method comprising:

receiving, by the receiver, a Multiple Input Multiple Output (MIMO) signal stream comprising different transmit hypotheses according to a modulation alphabet used for encoding the bits in the modulation symbol;

determining, by the processor, from the MIMO signal stream that was received, an input dataset including a plurality of input values corresponding to the different transmit hypotheses according to the modulation alphabet used for encoding the bits in the modulation symbol;

first computing, by the processor, of a first intermediary dataset by combining the input values of the input dataset according to a first combination scheme;

second computing, by the processor, of a second intermediary dataset by combining the input values of the input dataset according to a second combination scheme different from the first combination scheme; and assessing, by the processor, the reliability of the bits based on the first intermediary dataset and the second intermediary dataset, wherein at least one of the first computing or the second computing is iterated, wherein each of the intermediary datasets of a last iteration includes pairs of values corresponding to complementary transmit hypotheses for one of the bits encoded in the modulation symbol.

10. The method of claim 4, wherein the input dataset used in a first iteration of the computing steps includes one input value for each of the $2^J$ transmit hypotheses for the modulation symbol, wherein J denotes a number of the bits encoded in the modulation symbol.

11. A method of assessing the reliability of bits received via a modulation symbol on a channel, the method performed by a receiver comprising a processor at a receiving side of the channel, the method comprising:

receiving, by the receiver, a Multiple Input Multiple Output (MIMO) signal stream comprising different transmit hypotheses according to a modulation alphabet used for encoding the bits in the modulation symbol;

determining, by the processor, from the MIMO signal stream that was received, an input dataset including a plurality of input values corresponding to the different transmit hypotheses according to the modulation alphabet used for encoding the bits in the modulation symbol;

first computing, by the processor, of a first intermediary dataset by combining the input values of the input dataset according to a first combination scheme;

second computing, by the processor, of a second intermediary dataset by combining the input values of the input dataset according to a second combination scheme different from the first combination scheme; and assessing, by the processor, the reliability of the bits based on the first intermediary dataset and the second intermediary dataset, wherein at least one of the first computing or the second computing is iterated, wherein a number of intermediary datasets resulting from one iteration of the computing steps increases linearly with a number of the iterations.

12. The method of claim 4, wherein a number of values in each of the intermediary datasets resulting from one iteration of the computing steps decreases exponentially with the number of iterations.

13. The method of claim 4, wherein the iteration is terminated when the number of intermediary datasets computed in one iteration of the computing steps equals a number of the bits.

14. The method of claim 13, wherein the reliability of each of the bits is assessed based on a difference between the values in a corresponding one of the terminating intermediary datasets.

15. The method of claim 1, wherein each value in each of the datasets is indicative of at least one of a likelihood, a log-likelihood and a Euclidean distance.

16. The method of claim 1, wherein the channel is a Multiple-Input Multiple-Output, MIMO, channel and the modulation symbol is a symbol vector including a symbol value for each spatial layer of the MIMO channel.

17. The method of claim 1, further comprising the steps of:

receiving the modulation symbol on the channel; and estimating a state of the channel, wherein the channel state is indicative of at least one of gain and noise of the channel.

18. A computer program product comprising a non-transitory computer readable storage medium storing program code that performs the steps operations of claim 1 when the computer program product is executed by a processor if of a computer device.

19. A device for assessing the reliability of bits received by means of via a modulation symbol on a channel, the device comprising:

a receiving circuit, configured to receive a Multiple Input Multiple Output (MIMO) signal stream comprising different transmit hypotheses according to a modulation alphabet used for encoding the bits in the modulation symbol;

a providing circuit configured to determine, from the MIMO signal stream that was received, an input dataset including a plurality of input values corresponding to different transmit hypotheses according to a modulation alphabet used for encoding the bits in the modulation symbol;

a computing circuit configured to perform a first computing of a first intermediary dataset by combining the input values of the input dataset according to a first combination scheme and a second computing of a second intermediary dataset by combining the input values of the input dataset according to a second combination scheme different from the first combination scheme; and an assessing circuit configured to assess the reliability of the bits based on the first intermediary dataset and the second intermediary dataset, wherein the combining the input values of the input dataset includes at least one of applying a Jacobi logarithm, determining a minimum, determining a maximum or determining an approximation thereof.

* * * * *